United States Patent
Michaux et al.

(10) Patent No.: US 7,947,127 B2
(45) Date of Patent: May 24, 2011

(54) CEMENT RETARDER SYSTEMS, AND RETARDED CEMENT COMPOSITIONS

(75) Inventors: Michel Michaux, Verrieres-le-Buisson (FR); Tatiana Pyatina, East Setauket, NY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/723,976

(22) Filed: Mar. 15, 2010

(65) Prior Publication Data
US 2010/0168273 A1 Jul. 1, 2010

(51) Int. Cl.
*C04B 24/12* (2006.01)
(52) U.S. Cl. ......... 106/724; 106/727; 106/823; 166/293
(58) Field of Classification Search ................... 106/724, 106/727, 823; 166/293
See application file for complete search history.

(56) References Cited

U.S. PATENT DOCUMENTS

| | | |
|---|---|---|
| 4,714,113 A | 12/1987 | Mohnot et al. |
| 5,130,052 A | 7/1992 | Kreh et al. |
| 5,503,671 A | 4/1996 | Casabonne et al. |
| 5,503,672 A | 4/1996 | Barlet-Gouedard et al. |
| 6,277,900 B1 | 8/2001 | Oswald et al. |
| 7,004,256 B1 | 2/2006 | Chatterji et al. |
| 2004/0198873 A1 | 10/2004 | Bury et al. |
| 2005/0109507 A1 | 5/2005 | Heathman et al. |

FOREIGN PATENT DOCUMENTS

EP 0614859 9/1994

*Primary Examiner* — Paul Marcantoni
(74) *Attorney, Agent, or Firm* — David Cate; Robin Nava; Jeffrey Griffin

(57) ABSTRACT

A cement retarder system for use in underground wells included a borate compound, an organophosphonate salt, and a copolymer formed from AMPS and a monomer selected from the group consisting of acrylic acid, acrylamide and mixtures thereof. A method of using the retarder system in an underground well having a borehole drilled therein with a borehole wall, and further including a casing disposed in said borehole, such that an annulus exists between said casing and said borehole wall, comprising the steps of providing a cement composition and a liquid carrier, providing a retarder system for said cement composition comprising a borate compound, an organophosphonate salt, and a copolymer formed from AMPS and a monomer selected from the group consisting of acrylic acid, acrylamide, and mixtures thereof, mixing a sufficient amount of said retarder system to create a desired induction period with said cement composition and said liquid carrier to form a cement slurry, pumping the cement slurry from the surface down the casing, and causing said slurry to return to the surface in the annulus between the casing and the borehole wall.

4 Claims, 1 Drawing Sheet

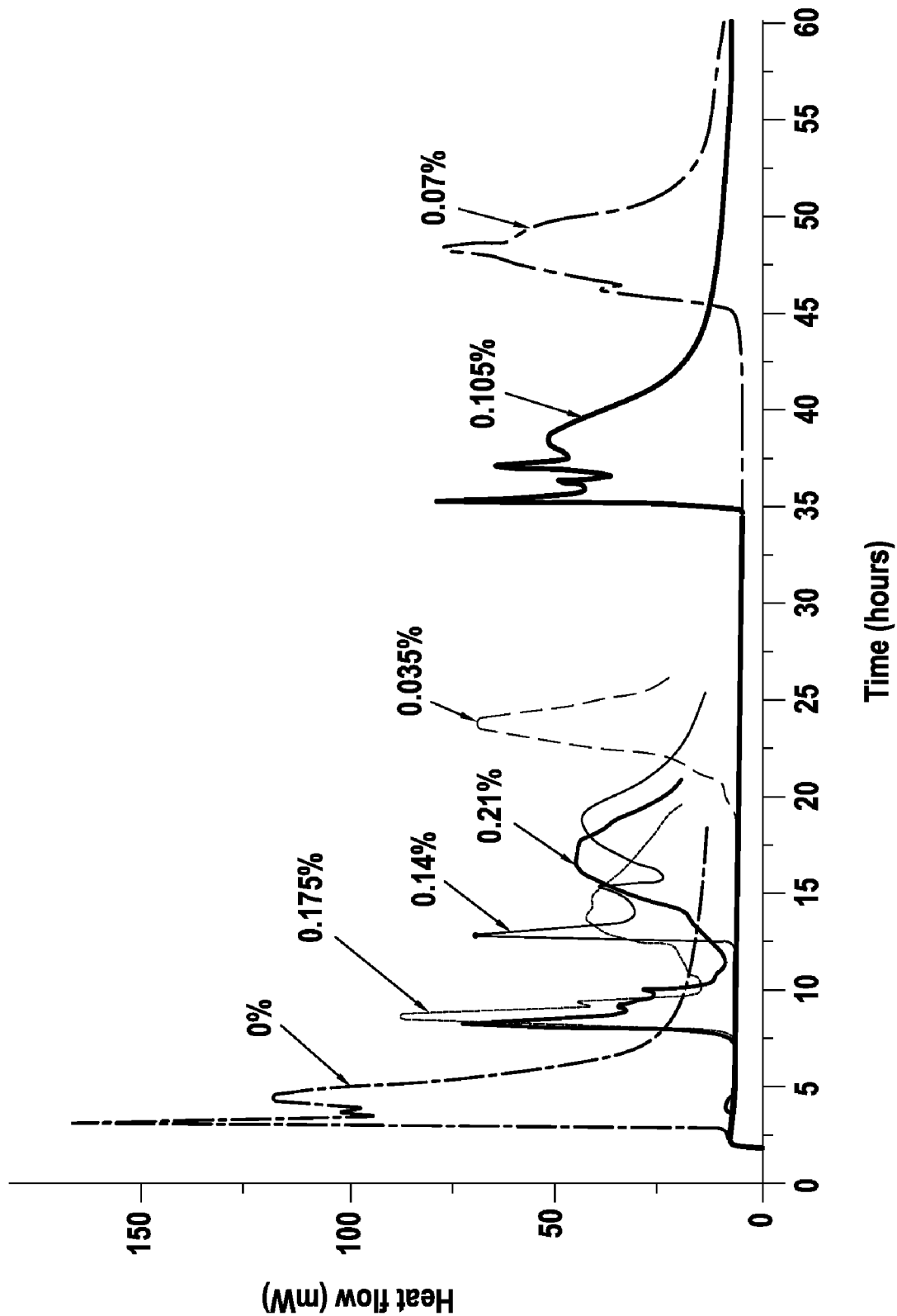

CEMENT RETARDER SYSTEMS, AND RETARDED CEMENT COMPOSITIONS

RELATED APPLICATION DATA

This application claims the benefit of EP Patent Application 06290547.6 filed Mar. 31, 2006 entitled, "Cement Retarders" and also claims the benefit of U.S. Provisional Application 60/746,806 filed May 9, 2006 entitled "Cement Retarders".

FIELD OF THE INVENTION

This invention relates to cement retarder systems and the retarded cement compositions produced by their use. In particular, the invention relates to such systems and compositions for use in cementing wells such as oil, gas and water wells.

BACKGROUND OF THE INVENTION

Cement slurries are used in the construction of wells such as oil and gas wells. One such use is in the setting of casing in the well. In this procedure, a casing (typically a steel tubular liner) is positioned in the well and a cement slurry is pumped from the surface down the casing so as to return to the surface in the annulus between the casing and the borehole wall. The cement fills the annulus and, once set, holds the casing in place and provides fluid isolation between the zones through which the borehole passes. In another use, a cement plug can be set in a well to prevent any further production of fluids to the surface.

Many wells can be several thousand metres in depth. This means that the temperatures at the bottom of such wells may be significantly elevated temperatures, sometimes in excess of 250° C. (482° F.). This can lead to problems in effective placement of the cement slurry. The time taken to pump a cement slurry into a deep well can mean that the onset of thickening caused by cement setting can become a problem, potentially leading to setting of the cement before it is properly placed either around the casing or as a plug.

This setting phenomenon has lead to the development of a series of additives for the cement slurry known as 'retarders'. These additives act on the cement slurry to delay setting for a sufficient period of time to allow the slurry to be properly placed. Examples of retarders for use in borehole cement slurries can be found in U.S. Pat. No. 5,503,671 and U.S. Pat. No. 5,503,672, the disclosures of which are incorporated herein by reference. These retarder systems are based on the use of mixtures of borate salts (e.g. sodium tetraborate decahydrate, boric acid, sodium pentaborate or potassium pentaborate) and ethylenediaminetetra (methylenephosphonic) (EDTMP) acid salts. However, these systems have been found difficult to use at temperatures of 250° C. (482° F.) and above.

This invention seeks to provide a cement retarder system that is effective at high temperatures, particularly when used with high density cement slurries that are commonly used to plug deep, hot wells. The invention is based on the use of a copolymfr formed frp, (2-acrylamido-2-methylpropane-3-sulphonic acid) and acrylic acid and/or acrylamide. Such copolymers are known as fluid loss control additives for cement slurries, as disclosed in U.S. Pat. No. 6,277,900, the disclosure of which is incorporated herein by reference.

SUMMARY OF THE INVENTION

The invention provides a cement retarder system, comprising a borate compound, an organophosphonate salt; and a copolymer formed from 2-acrylamido-2-methylpropane-3-sulphonic acid (AMPS) and a monomer selected from the group consisting of acrylic acid, acrylamide and mixtures thereof wherein the components are present in a form that allows mixing with a cement slurry.

In one embodiment, the borate-to-organophosphonate molar ratio is from about 8 to about 18, and preferably from about 12 to about 14.

In one embodiment the borate salt is selected from the group consisting of sodium pentaborate ($Na_2B_{10}O_{16}$), sodium tetraborate ($Na_2B_4O_7$) and boric acid ($H_3BO_3$). The borate salts can contain crystallization water molecules.

In one embodiment, the organophosphonate is selected from the group consisting of the sodium or calcium salts of ethylenediaminetetra (methylenephosphonic acid) (EDTMP) hexamethylenediaminetetra (methylenephosphonic acid) and diethylenetriaminepenta (methylenephosphonic acid).

In one embodiment of the AMPS copolymer, acrylamide is used as the monomer.

In another embodiment of the AMPS copolymer, the monomer is acrylic acid or the copolymer is a terpolymer formed using both acrylic acid and acrylamide. The term 'copolymer' used here includes copolymers, terpolymers and mixtures and combinations thereof.

In one embodiment, the AMPS copolymer or terpolymer comprises from about 40 weight percent (wt. %) to about 90 weight percent, preferably from about 60 wt. % to about 80 wt. %. The molecular weight of the AMPS copolymer is preferably from about 5,000 to about 2,000,000. In another embodiment, the AMPS copolymer has a molecular weight of from about 600,000 to about 1,000,000.

In another embodiment, the copolymer is a combination of at least two copolymers with different ranges of molecular weight. The molecular weight of the first of the two copolymers is typically from about 5,000 to about 100,000 and the molecular weight range of the second copolymer is typically from about 600,000 to about 1,000,000.

The invention also provides a retarded cement composition comprising a cement, a liquid carrier, (typically water), a retarder system as defined above present in an amount sufficient to delay setting of the cement; and optional additives to otherwise modify the behaviour of the cement composition (e.g. antifoam agents, silica flour, bentonite, dispersants and the like).

In one embodiment of the retarded cement composition, the borate/organophosphonate combination may be present in the retarded cement composition in amounts of from about 1 to about 12% by weight of cement (BWOC).

In one embodiment, the copolymer is present in an amount of from about 0.1 to about 0.6% BWOC.

In one embodiment, the cement is Portland cement (e.g. ISO/API class G or H);

In another embodiment, the cement composition has a density greater than 2.0 kg/L (16.7 lbm/gal).

The invention also provides a method of using a retarder system in an underground well having a borehole drilled therein with a borehole wall, and further including a casing disposed in said borehole, such that an annulus exists between said casing and said borehole wall, said method comprising providing a cement composition and a liquid carrier, providing a retarder system for said cement composition comprising a borate compound, an organophosphonate salt, and a copolymer formed from AMPS and a monomer selected from the group consisting of acrylic acid, acrylamide, and mixtures thereof, mixing a sufficient amount of said retarder system to create a desired induction period with said cement composition and said liquid carrier to form a cement slurry, pumping the cement slurry from the surface down the casing, and causing said slurry to return to the surface in the annulus between the casing and the borehole wall.

In one embodiment, the method of using a retarder system in a cementing operations in an underground well is performed when the temperature in the well is greater than 150° C. (302° F.) and preferably greater than 250° C. (482° F.).

BRIEF DESCRIPTION OF THE DRAWINGS

FIG. 1 shows a plot of heat flow vs. time for calorimeter measurements on various cement compositions.

DETAILED DESCRIPTION OF THE INVENTION

FIG. 1 shows a plot of heat flow vs. time for a series of cement compositions measured in an isothermal calorimeter to determine the length of the induction period (time period during which the cement slurry does not set), the end of the induction period being indicated by the sudden increase in heat flow. The concentration of borate was maintained constant at 4% BWOC (by weight of cement) in all tests plotted in FIG. 1, and the concentration of EDTMP was varied between 0% and 0.21%, as indicated. FIG. 1 shows that the length of induction period varies with the borate:EDTMP ratio.

At 0% EDTMP the cement begins to set as soon as the test temperature is reached, (i.e., 182° C. [360° F.]), after about 2 and a half hours. The addition of very small concentrations of EDTMP (0.035 and 0.07% BWOC) significantly lengthens the induction period to 20 and 45 hours, respectively. Further additions of EDTMP lengthen the induction period by a lesser amount, 7 and a half hours with 0.175% BWOC EDTMP. Without wishing to be bound by theory, it is believed that this reduction in retarding effect is due to the fact that EDTMP accelerates the hydration rate of the ferrite phase (i.e., $Ca_4Al_2Fe_2O_{10}$) of Portland cements. This accelerating effect is counterbalanced to some extent in the presence of borate but the induction period is shortened when the borate-to-EDTMP ratio becomes too low.

Adequate borate-to-EDTMP ratios allow long induction periods to be obtained when cement slurries are left under static conditions (i.e., not agitated) as it is the case in the calorimeter cell.

The schedules of thickening time tests (consistometer) for examples given below at different temperatures are shown in Table 1:

TABLE 1

| BHCT ° C. (° F.) | Initial Pressure MPa (psi) | Final Pressure MPa (psi) | Time to reach BHCT (min) |
| --- | --- | --- | --- |
| 260 (500) | 12.76 (1,850) | 203.4 (29,500) | 90 |
| 274 (525) | 12.76 (1,850) | 203.4 (29,500) | 95 |
| 288 (550) | 12.76 (1,850) | 203.4 (29,500) | 100 |

During the thickening time tests, the cement slurries are under dynamic conditions (i.e. agitated). In the consistometer there is a paddle inside the cell and the cell rotates at 150 rpm.

The effect of borate-to-EDTMP molar ratio on the thickening time of cement slurries was investigated at bottomhole circulating temperature (BHCT) of 260° C. (500° F.), using sodium pentaborate decahydrate ($Na_2B_{10}O_{16} \cdot 10H_2O$) as the borate.

The basic cement slurry used is given below:
Class G Cement
2.7 L/tonne of cement of Antifoam Agent
35% BWOC Silica Flour
0.5% BWOC Bentonite
1.74% BWOC Dispersant (with 5% BWOC Pentaborate)
or
2.32% BWOC Dispersant (with 10% BWOC Pentaborate)
5 or 10% BWOC sodium pentaborate decahydrate
0 to 0.89% BWOC EDTMP.

The solid additives are dry-blended with the cement, except the bentonite, which is pre-hydrated in the mix water and the antifoam agent is added to the mix water. The cement blends are mixed with fresh water at a density of 1.89 kg/L (15.8 lbm/gal).

The results of consistometer (thickening time) tests for the various mixtures are presented in Table 2 below:

TABLE 2

| Pentaborate (% BWOC) | EDTMP (% BWOC) | Pentaborate-to-EDTMP Molar Ratio | Thickening Time @ 260° C. (500° F.) (hr:min) |
| --- | --- | --- | --- |
| 5 | 0 | — | 1:39 |
| 5 | 0.15 | 24.5 | 4:17 |
| 5 | 0.30 | 12.4 | 4:46 |
| 5 | 0.44 | 8.4 | 5:19 |
| 10 | 0.30 | 24.5 | 1:58 |
| 10 | 0.59 | 12.4 | 5:30 |
| 10 | 0.89 | 8.3 | 4:33 |

The results demonstrate a synergy between the two components, i.e., between pentaborate and EDTMP.

It can be shown that there is a synergy between borate/EDTMP retarders and AMPS-acrylamide fluid loss control additives, especially at BHCTs above 149° C. (300° F.). This synergy results in the need for a lower retarder concentration to achieve a given thickening time at a given BHCT. It is believed that the acrylamide part of the copolymer can hydrolyze into acrylate, which is known to be able to retard the hydration of cements.

The effect of AMPS-acrylamide fluid loss control additives on the thickening time of cement slurries retarded with 10% BWOC sodium pentaborate decahydrate and 0.59% BWOC EDTMP (Pentaborate-to-EDTMP molar ratio of 12.4) is shown in Table 3 below for the following cement composition:
Class G Cement
2.7 L/tonne of cement Antifoam Agent
35% BWOC Silica Flour
2.32% BWOC Dispersant
10% BWOC Sodium Pentaborate Decahydrate
0.59% BWOC EDTMP
0 to 0.3% BWOC AMPS-acrylamide fluid loss control additive.

The solid additives are dry-blended with the cement. The antifoam agent is added to the mix water. The cement blends are mixed with fresh water at a density of 1.89 kg/L (15.8 lbm/gal).

TABLE 3

| AMPS-acrylamide fluid loss control additive (% BWOC) | Thickening Time @ 260° C. (500° F.) (hr:min) |
| --- | --- |
| 0 | 5:30 |
| 0.1 | 7:19 |
| 0.2 | 9:10 |
| 0.3 | 6:31 |

The addition of small amounts of AMPS-acrylamide fluid loss control additive lengthens the thickening time.

So the presence of AMPS-acrylamide fluid loss control additive can be beneficial to obtain longer thickening times at elevated temperatures. However, too high concentrations of AMPS-acrylamide fluid loss control additive may be detrimental. It can be shown that an optimum concentration of AMPS-acrylamide fluid loss control additive exists to ensure longer thickening times at elevated temperatures. The optimum concentration varying between 0.1% and 0.6% BWOC may depend on several parameters such as the cement brand, pentaborate and EDTMP concentrations, temperature, presence of other additives and their concentrations. For example, for cement of Table 3, optimum concentration will be at 0.2% BWOC and for cement of Table 6 (Tests 7-8), optimum concentration will be at 0.4% BWOC.

The density of the cement slurries can be controlled using the techniques described in EP 0621247, incorporated herein by reference. This approach is used to increase the density of cement slurries used in these tests. Such high density cement slurries are prepared using either a Class G cement or a Class H cement and the effect of AMPS-acrylamide fluid loss control additive and borate-to-EDTMP molar ratio on the thickening time is studied.

First Series of Experiments

For the first series of experiments, a high density cement blend, made of cement class G, is used with the following additives:

2.5 L/tonne of blend of Antifoam Agent
1.47% BWOC Dispersant
7.2% BWOC Sodium Pentaborate Decahydrate
0.42% BWOC EDTMP
0 to 0.27% BWOC AMPS-acrylamide fluid loss control additive.

The solid additives are dry-blended with the high density cement mixture, which is mixed with fresh water at a density of 2.16 kg/L (18 lbm/gal). The antifoam agent is added to the mix water.

The solid volume fraction (SVF, percentage of total slurry volume that is provided by solid components) is 60%.

The Pentaborate-to-EDTMP molar ratio is maintained at 12.7, and the concentration of AMPS-acrylamide fluid loss control additive varied.

Thickening times are measured at 274° C. (525° F.) and the results gathered in Table 4, demonstrating that small concentrations of AMPS-acrylamide fluid loss control additive can provide significant increase in thickening time. These results are in agreement with the data shown in Table 3.

TABLE 4

| Test | Pentaborate % BWOC | EDTMP % BWOC | AMPS-acrylamide fluid loss control additive % BWOC | Pentaborate-to-EDTMP Molar Ratio | BHCT ° C. (° F.) | Thick. Time @ 274° C. (525° F.) (hr:min) |
|---|---|---|---|---|---|---|
| 1 | 7.2 | 0.42 | 0 | 12.7 | 274 (525) | 3:12 |
| 2 | 7.2 | 0.42 | 0.16 | 12.7 | 274 (525) | 3:57 |
| 3 | 7.2 | 0.42 | 0.27 | 12.7 | 274 (525) | 5:11 |

Second Series of Experiments

For the second series of experiments, a high density cement blend, made of cement class G, is used with the following additives:

2.5 L/tonne of blend of Antifoam Agent
2.23% BWOC Dispersant
8.9% BWOC Sodium Pentaborate Decahydrate
0.3% BWOC AMPS-acrylamide fluid loss control additive
0.52 to 0.69% BWOC EDTMP.

The high density cement mixture is prepared as in the first series of experiments to give a slurry of density 2.16 kg/L (18 lbm/gal) and SVF of 60%.

The concentration of AMPS-acrylamide fluid loss control additive is maintained constant at 0.3% BWOC, and the concentration of EDTMP varied (Tests 4 and 5 in Table 5 below). Thickening times are measured at 274° C. (525° F.). Thickening time decreases with increased EDTMP concentration (i.e., lower Pentaborate-to-EDTMP molar ratio). This is in agreement with data shown in Table 2 when 10% BWOC pentaborate is used. A thickening time of about 4 and a half hours can be achieved at 288° C. (550° F.) with a Pentaborate-to-EDTMP molar ratio of 12.6 and when 0.3% BWOC AMPS-acrylamide fluid loss control additive is present in the slurry (Test 6).

TABLE 5

| Test | Pentaborate % BWOC | EDTMP % BWOC | AMPS-acrylamide fluid loss control additive % BWOC | Pentaborate-to-EDTMP Molar Ratio | BHCT ° C. (° F.) | Thick. Time (hr:min) |
|---|---|---|---|---|---|---|
| 4 | 8.9 | 0.52 | 0.3 | 12.6 | 274 (525) | 6:47 |
| 5 | 8.9 | 0.69 | 0.3 | 9.5 | 274 (525) | 5:48 |
| 6 | 8.9 | 0.52 | 0.3 | 12.6 | 288 (550) | 4:36 |

Third Series of Experiments

For Tests 7 and 8 in Table 6 below, a high density cement blend, made of cement class H, with following additives is used:

2.5 L/tonne of blend of Antifoam Agent
1.49% BWOC Dispersant
8.1% BWOC Sodium Pentaborate Decahydrate
0.47% BWOC EDTMP
0.27 to 0.41% BWOC AMPS-acrylamide fluid loss control additive The high density cement mixture is prepared as in the first series of experiments to give a slurry of density 2.16 kg/L (18.0 lbm/gal) and SVF of 60%.

For Tests 9 and 10 in Table 6 below, a high density cement blend, made of cement class H, with the following additives is used:
- 2.5 L/tonne of blend of Antifoam Agent
- 1.63% BWOC Dispersant
- 8.9% BWOC Sodium Pentaborate Decahydrate
- 0.52% BWOC EDTMP
- 0.59% BWOC AMPS-acrylamide fluid loss control additive.

The high density cement mixture is prepared as in the first series of experiments to give a slurry of density 2.16 kg/L (18.0 lbm/gal) and SVF of 60%.

Tests 7 and 8: As previously observed with Class G Cement (see Table 4), the thickening time is lengthened when increasing the concentration of AMPS-acrylamide fluid loss control additive.

Tests 9 and 10: Quite long thickening times can be achieved at 274° C. (525° F.) and 288° C. (550° F.) when the Pentaborate-to-EDTMP molar ratio is 12.6 and when 0.59% BWOC AMPS-acrylamide fluid loss control additive is present in the slurry.

TABLE 6

| Test | Pentaborate % BWOC | EDTMP % BWOC | AMPS-acrylamide fluid loss control additive % BWOC | Pentaborate-to-EDTMP Molar Ratio | BHCT ° C. (° F.) | Thick. Time (hr:min) |
|---|---|---|---|---|---|---|
| 7 | 8.1 | 0.47 | 0.27 | 12.7 | 274 (525) | 1:16 |
| 8 | 8.1 | 0.47 | 0.41 | 12.7 | 274 (525) | 4:26 |
| 9 | 8.9 | 0.52 | 0.59 | 12.6 | 274 (525) | 7:49 |
| 10 | 8.9 | 0.52 | 0.59 | 12.6 | 288 (550) | 5:23 |

Fourth Series of Experiments

For the fourth series of experiments, a high density cement blend, made of cement class H, with the following additives is used:
- 2.5 L/tonne of blend of Antifoam Agent
- 1.63% BWOC Dispersant
- 8.9% BWOC Sodium Pentaborate Decahydrate
- 0.45% BWOC AMPS-acrylamide fluid loss control additive
- 0.42 to 0.62% BWOC EDTMP The high density cement mixture is prepared as in the first series of experiments to give a slurry of density 2.16 kg/L (18.0 lbm/gal) and SVF of 60%. Results are shown in Table 7.

The thickening time decreases with increased EDTMP concentration. These results are in agreement with those obtained with Class G cement (see Tests 4 and 5 in Table 5). The thickening time of Test 12 is shorter than that of Test 9 (see Table 6), which contains a higher concentration of AMPS-acrylamide fluid loss control additive. This is in agreement with the Tests 1, 2 and 3 in Table 4, and with the Tests 7 and 8 in Table 6.

TABLE 7

| Test | Pentaborate % BWOC | EDTMP % BWOC | AMPS-acrylamide fluid loss control additive % BWOC | Pentaborate-to-EDTMP Molar Ratio | BHCT ° C. (° F.) | Thick. Time (hr:min) |
|---|---|---|---|---|---|---|
| 11 | 8.9 | 0.42 | 0.45 | 15.6 | 274 (525) | 7:00 |
| 12 | 8.9 | 0.52 | 0.45 | 12.6 | 274 (525) | 6:02 |
| 13 | 8.9 | 0.62 | 0.45 | 10.6 | 274 (525) | 5:11 |

What is claimed is:

1. A method of using a retarder in an underground well having a borehole drilled therein with a borehole wall, and further including a casing disposed in said borehole, such that an annulus exists between said casing and said borehole wall, said method comprising the steps of: providing a cement composition and a liquid carrier, providing a retarder for said cement composition comprising a borate compound, an organophosphonate salt, and a copolymer formed from AMPS and a monomer selected from the group consisting of acrylic acid, acrylamide, and mixtures thereof, mixing a sufficient amount of said retarder to create an effective induction period with said cement composition and said liquid carrier to form a cement slurry, pumping the cement slurry from the surface down the casing, and causing said slurry to return to the surface in the annulus between the casing and the borehole wall.

2. The method of claim 1, wherein the temperature in the well is greater than 150° C. (302° F.).

3. The method of claim 2, wherein the temperature in the well is greater than 250° C. (482° F.).

4. A method according to claim 1 where said AMPS copolymer has a molecular weight between 5,000 and 2,000,000.

* * * * *